(12) United States Patent
Li et al.

(10) Patent No.: US 12,126,897 B2
(45) Date of Patent: Oct. 22, 2024

(54) BANDWIDTH SAVING FOR WIRELESS CAMERA USING MOTION VECTORS

(71) Applicant: GM Global Technology Operations LLC, Detroit, MI (US)

(72) Inventors: Chuan Li, Troy, MI (US); Jace C. Stokes, Highland, MI (US); Sushama K. Mithapally, Northville, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 18/158,743

(22) Filed: Jan. 24, 2023

(65) Prior Publication Data
US 2024/0251160 A1  Jul. 25, 2024

(51) Int. Cl.
*H04N 23/65* (2023.01)
*B60R 11/04* (2006.01)
(Continued)

(52) U.S. Cl.
CPC ............ *H04N 23/651* (2023.01); *G06T 7/13* (2017.01); *G06T 7/194* (2017.01); *G06T 7/20* (2013.01);
(Continued)

(58) Field of Classification Search
CPC ............... H04N 23/65; H04N 23/651; H04N 23/66–662; H04N 23/667; H04N 23/681; H04N 23/6811; H04N 23/6812; B60R 11/04; B60R 2300/00–8093; G06F 1/1686; G06F 1/1698; H04M 1/0264; G06T 7/13; G06T 7/194; G06T 7/20;
(Continued)

(56) References Cited

U.S. PATENT DOCUMENTS 11,595,619 B1   2/2023 Gate et al.
2012/0105637 A1  5/2012 Yousefi et al.
(Continued)

OTHER PUBLICATIONS

United States Patent and Trademark Office. U.S. Appl. No. 18/150,371, filed Jan. 5, 2023.
(Continued)

*Primary Examiner* — Twyler L Haskins
*Assistant Examiner* — Akshay Trehan
(74) *Attorney, Agent, or Firm* — Vivacqua Crane, PLLC

(57) ABSTRACT

A system for bandwidth saving for wireless cameras using motion vectors includes wireless cameras disposed within the vehicle, and capturing input image data. A control module, having a processor, memory, and input/output (I/O) ports, executes control logic stored in memory. A first control logic receives, real-time input image data from the cameras. A second control logic processes the input image data to maintain (Wi-Fi) bandwidth utilization within the vehicle below a predetermined threshold and maintains and maximizes real-time image data streaming quality through semantic segmentation and background memorization. A third control logic generates an output including background and foreground image portions. The output is transmitted to a human-machine interface (HMI) within the vehicle and periodically replaces the background portion with a cached background scene that is transmitted to the HMI.

20 Claims, 5 Drawing Sheets

(51) Int. Cl.
  *G06T 7/13*    (2017.01)
  *G06T 7/194*   (2017.01)
  *G06T 7/20*    (2017.01)
  *G06T 7/60*    (2017.01)
  *G06V 10/75*   (2022.01)
  *G06V 10/764*   (2022.01)
  *H04N 23/661*   (2023.01)
  *H04N 23/68*   (2023.01)

(52) U.S. Cl.
  CPC .............. *G06T 7/60* (2013.01); *G06V 10/751* (2022.01); *G06V 10/764* (2022.01); *H04N 23/661* (2023.01); *H04N 23/681* (2023.01); *B60R 11/04* (2013.01); *B60R 2300/404* (2013.01); *B60R 2300/406* (2013.01); *G06T 2207/10024* (2013.01); *G06T 2207/30252* (2013.01)

(58) Field of Classification Search
  CPC ............. G06T 7/60; G06T 2207/10024; G06T 2207/30252; G06V 10/751; G06V 10/764
  See application file for complete search history.

(56) References Cited

U.S. PATENT DOCUMENTS

| | | | |
|---|---|---|---|
| 2013/0321629 A1* | 12/2013 | Zhang | G06T 3/00 348/148 |
| 2017/0150299 A1 | 5/2017 | Coutinho et al. | |
| 2017/0347158 A1 | 11/2017 | Fu et al. | |
| 2018/0139585 A1 | 5/2018 | Gholmieh et al. | |
| 2018/0297210 A1 | 10/2018 | Peterson et al. | |
| 2018/0299900 A1* | 10/2018 | Bae | G05D 1/0238 |
| 2018/0367731 A1 | 12/2018 | Gatti et al. | |
| 2018/0376067 A1* | 12/2018 | Martineau | H04N 23/60 |
| 2019/0073539 A1 | 3/2019 | Yu et al. | |
| 2019/0230323 A1* | 7/2019 | Koravadi | H04N 23/60 |
| 2019/0253853 A1 | 8/2019 | Makled et al. | |
| 2019/0320328 A1 | 10/2019 | Magzimof et al. | |
| 2019/0325667 A1 | 10/2019 | Kim et al. | |
| 2019/0340844 A1 | 11/2019 | Tonshal et al. | |
| 2019/0354111 A1 | 11/2019 | Cheng et al. | |
| 2019/0355178 A1 | 11/2019 | Martinez et al. | |
| 2020/0074326 A1 | 3/2020 | Balakrishnan et al. | |
| 2020/0351322 A1 | 11/2020 | Magzimof et al. | |
| 2021/0109881 A1 | 4/2021 | Moustafa et al. | |
| 2021/0256754 A1 | 8/2021 | Guo | |
| 2022/0137615 A1 | 5/2022 | Eperjesi et al. | |
| 2022/0161816 A1 | 5/2022 | Gyllenhammar et al. | |
| 2022/0368860 A1 | 11/2022 | Shinohara et al. | |
| 2022/0368972 A1 | 11/2022 | Cheraghi et al. | |
| 2022/0394283 A1 | 12/2022 | Cao | |
| 2023/0026675 A1* | 1/2023 | Wingarten | F16M 13/022 |
| 2023/0096468 A1 | 3/2023 | Ong et al. | |
| 2023/0269566 A1 | 8/2023 | Spagnolini et al. | |

OTHER PUBLICATIONS

"Cadillac CELESTIQ Establishes New Standard of Automotive Luxury," Cadillac Pressroom, Oct. 27, 2022, htttps://media.cadillac.com/media/us/en/cadillac/home.detail.print.html/content/Pages/news/us/en/2022/oct/1017-celestiq.html.

Ahlswede, et al. "Network Information Flow," IEEE Transactions on Information Theory, vol. 46, No. 4, Jul. 2000, pp. 1204-1216.

Byers, et al. "A digital fountain approach to reliable distribution of bulk data," Conference on Applications, Technologies, Architectures, and Protocols for Computer Communication, 1998, pp. 56-67.

Chou, et al. "Practical Network Coding," Microsoft Allerton Conference on Communication, Control, and Computing, Oct. 2003, pp. 1-10.

Lopez, Jonathan. "General Motors Developing Connected Camera Platform," GM Authority Blog, Oct. 11, 2021, https://gmauthority.com/blog/2021/10/general-motors-developing-connected-camera-platform/.

* cited by examiner

BANDWIDTH SAVING FOR WIRELESS CAMERA USING MOTION VECTORS

INTRODUCTION

The present disclosure relates to systems and methods for saving bandwidth during the use of wirelessly-enabled or Wi-Fi cameras for in-vehicle applications.

This introduction generally presents the context of the disclosure. Work of the presently named inventors, to the extent that it is described in this introduction, as well as aspects of the description that may not otherwise qualify as prior art at the time of filing, are neither expressly nor impliedly admitted as prior art against this disclosure.

Vehicle users frequently utilize a variety of wirelessly enabled devices, including cameras while driving or otherwise occupying their vehicles. Vehicle Wi-Fi systems have limited bandwidth and are faced with increasing demands from data-intensive applications and wirelessly enabled devices. The increasing bandwidth demands can impact quality of service (QOS) for applications and devices utilizing onboard vehicle Wi-Fi systems. Accordingly, wirelessly enabled devices within a vehicle may experience data loss and video frame stability issues while utilizing onboard vehicle Wi-Fi systems.

Accordingly, while current systems and methods for saving bandwidth for wirelessly enabled devices in vehicles operate for their intended purpose, there is a need for a new and improved system and method for bandwidth saving for Wi-Fi cameras that maintains QoS for in-vehicle applications, avoid service outages, and improves video frame stability.

SUMMARY

According to several aspects, of the present disclosure, a system for bandwidth saving for wirelessly enabled cameras using motion vectors in a vehicle includes one or more wirelessly enabled cameras disposed within the vehicle, the one or more wirelessly enabled cameras capturing real-time input image data. The system further includes a control module having a processor, a memory, and one or more input/output (I/O) ports, the memory storing programmatic control logic. The processor executes the programmatic control logic. The programmatic control logic includes: a first control logic portion that receives, via the I/O ports, the real-time input image data from the wirelessly enabled cameras. A second control logic portion processes the real-time input image data to maintain wireless system (Wi-Fi) bandwidth utilization with the vehicle below a predetermined threshold bandwidth level and maximizes real-time input image data streaming quality through semantic segmentation and background memorization. A third control logic portion generates an output including a masked background image portion and a foreground image portion. The output is transmitted, via the I/O ports, to a human-machine interface (HMI) within the vehicle, and replaces the masked background image portion with cached background data including a background scene that is periodically transmitted to the HMI.

In another aspect of the present disclosure, the real-time input image data defines one or more video frames. Semantic segmentation within the second control logic portion further includes control logic that periodically performs pixel-level classification of foreground and background portions of the input image data.

In another aspect of the present disclosure, the second control logic portion further includes control logic that performs motion vector analysis of the one or more video frames. Information within the one or more video frames is tracked via grid references through each subsequent one of the one or more video frames.

In another aspect of the present disclosure, the motion vector analysis further includes: control logic that defines a plurality of macroblocks that are tracked from position to position through motion vector position data; control logic that defines one or more data points within one or more of the macroblocks as falling within a radius that covers all points in motion vector space; and control logic that, upon determining that the radius is less than or equal to a threshold value, defines the one or more data points as background motion vector information, and upon determining that the radius is greater than the threshold value, initiates semantic segmentation once more to segment the one or more data points and defines the one or more data points as foreground motion vector information.

In another aspect of the present disclosure, the background memorization further includes control logic that tracks all of the one or more data points that define background information with a single background motion vector.

In another aspect of the present disclosure, the background memorization further includes control logic that packages real-time input image data in a per-frame data structure that is shared between the wirelessly enabled device and onboard vehicle control modules. The per-frame data structure defines the background motion vector information and one or more blocks, each of the one or more blocks including a block index, a motion vector, and residuals.

In another aspect of the present disclosure, the block index includes an integer assigned to each macroblock within the input image data. The residuals include values defining pixel value differences between macroblocks for each of the one or more video frames and each subsequent one of the one or more video frames.

In another aspect of the present disclosure, the background memorization further includes control logic that utilizes template matching to reduce processing bandwidth utilization for foreground object localization searching from a first amount to a second amount less than the first amount. The template matching generates a sampling template based on coloration differences within each of the one or more video frames, and tracks positions of the coloration differences through a coordinate system and area calculations defined by: (x, y, w, h), where x defines an X-coordinate, y defines a Y-coordinate, w defines a width, and h defines a height. The template matching further defines a background average motion vector v and defines an initial template matching position as (x', y', w, h) where:

1. x'=x+vx, y'=y+vy;
    and defines a searching area margin Δd such that an entire searching area is given by a rectangular area defined as:
2. (x'+Δd, y'+Δd, w+2Δd, h+2Δd).

In another aspect of the present disclosure, the background memorization further includes control logic that reduces processing bandwidth utilization for foreground object localization searching from a first amount to a second amount less than the first amount by: selecting a pixel at a foreground edge within each of the one or more video frames using color gradients; mapping a single pixel to a square region of width α; collecting selected pixels and mapped regions for each of the pixels; and ranking mapped regions via pixel value differences. The mapped regions are ranked in ascending order within two-dimensional matrix. The mapped regions having numerically lower ranking values define areas of the foreground image that contain larger color gradients than mapped regions having numerically higher ranking values. Foreground edges are computed according to:

$$RMSE_{pixels} = \left[\sum_{i=0}^{a}(B_{i,b-1} - F_{i,b})^2/a\right]^{1/2} \leq \beta, \qquad 3.$$

where a is a quantity of pixels, B defines background pixels, F defines foreground pixels, and β is a threshold value. Upon determining that the $RMSE_{pixels}$ value is equal to or below the threshold β value. The pixels are taken as defining a boundary between foreground and background portions within the one or more video frames, and upon determining that the $RMSE_{pixels}$ value is greater than the threshold β value, the pixels do not define a boundary between foreground and background within the one or more video frames.

In another aspect of the present disclosure, the foreground image portion is continuously transmitted to the HMI and overlaid upon the masked background image portion, and the background image portion contains recurrent information that is periodically transmitted to the HMI.

In another aspect of the present disclosure, a method for bandwidth saving for wirelessly enabled cameras using motion vectors in a vehicle includes: capturing real-time input image data from one or more wirelessly enabled cameras disposed within the vehicle. The method includes utilizing a control module having a processor, a memory, and one or more input/output (I/O) ports, the memory storing programmatic control logic, the processor executing the programmatic control logic. The method includes receiving, with a first control logic portion via the I/O ports, the real-time input image data from the wirelessly enabled cameras, and processing, with a second control logic portion, the real-time input image data to maintain wireless system (Wi-Fi) bandwidth utilization with the vehicle below a predetermined threshold bandwidth level and maximizes real-time input image data streaming quality through semantic segmentation and background memorization. The method further includes executing control logic that caches background motion vector data as a background scene; generating, with a third control logic portion, an output including the cached background scene and a foreground image portion, and transmitting, via the I/O ports, the output to a human-machine interface (HMI) within the vehicle.

In another aspect of the present disclosure, capturing real-time image date further includes capturing one or more video frames. Processing, with a second control logic portion further includes performing semantic segmentation by periodically performing pixel-level classification of foreground and background portions of the input image data.

In another aspect of the present disclosure, performing background memorization further includes performing motion vector analysis of the one or more video frames. Information within the one or more video frames is tracked via grid references through each subsequent one of the one or more video frames.

In another aspect of the present disclosure, performing background memorization further includes executing control logic that defines a plurality of macroblocks that are tracked from position to position through motion vector position data, and executing control logic that defines one or more data points within one or more of the macroblocks as falling within a radius that covers all points in motion vector space. Performing background memorization further includes executing control logic that, upon determining that the radius is less than or equal to a threshold value, defines the one or more data points as background motion vector information, and upon determining that the radius is greater than threshold value, initiates semantic segmentation once more to segment the one or more data points and defines the one or more data points as foreground motion vector information.

In another aspect of the present disclosure, performing background memorization further includes executing control logic that tracks all of the one or more data points that define background information with a single background motion vector.

In another aspect of the present disclosure, performing background memorization further includes packaging real-time input image data in a per-frame data structure that is shared between the wirelessly enabled device and onboard vehicle control modules. The per-frame data structure defines the background motion vector information and one or more blocks, each of the one or more blocks including a block index, a motion vector, and residuals.

In another aspect of the present disclosure, packaging real-time input image data further includes generating the block index by assigning an integer to each macroblock within the input image data, and defining residuals as values defining pixel value differences between macroblocks for each of the one or more video frames and each subsequent one of the one or more video frames.

In another aspect of the present disclosure, processing, with a second control logic portion further includes performing background memorization by template matching to reduce processing bandwidth utilization for foreground object localization searching from a first amount to a second amount less than the first amount. The template matching generates a sampling template based on coloration differences within each of the one or more video frames, and tracks positions of the coloration differences through a coordinate system and area calculations defined by: (x, y, w, h), where x defines an X-coordinate, y defines a Y-coordinate, w defines a width, and h defines a height. The template matching further defines a background average motion vector v and defines an initial template matching position as (x', y', w, h) where:

1. x'=x+vx, y'=y+vy, and defines a searching area margin Δd such that an entire searching area is given by a rectangular area defined as 2. (x'+Δd, y'+Δd, w+2Δd, h+2Δd).

In another aspect of the present disclosure, performing background memorization further includes executing control logic for reducing processing bandwidth utilization for foreground object localization searching from a first amount to a second amount less than the first amount by selecting a pixel at a foreground edge within each of the one or more video frames using color gradients. Performing background memorization further includes mapping single pixels to a square region of width α, collecting selected pixels and mapped regions for each of the pixels, and ranking mapped regions in ascending order within a two-dimensional matrix via pixel value differences. The mapped regions having numerically lower ranking values define areas of the foreground image that contain larger color gradients than mapped regions having numerically higher ranking values, wherein foreground edges are computed according to:

$$RMSE_{pixels} = \left[\sum_{i=0}^{a} (B_{i,b-1} - F_{i,b})^2 / a\right]^{1/2} \le \beta, \qquad 3.$$

where a is a quantity of pixels, B defines background pixels, F defines foreground pixels, and β is a threshold value. Upon determining that the RMSE$_{pixels}$ value is equal to or below the threshold β value, the pixels are taken as defining a boundary between foreground and background portions within the one or more video frames, and upon determining that the RMSE$_{pixels}$ value is greater than the threshold β value, the pixels do not define a boundary between foreground and background within the one or more video frames; and continuously transmitting the foreground image portion to the HMI and overlaying the foreground image upon the masked background image portion. The background image portion contains recurrent information that is periodically transmitted to the HMI.

In another aspect of the present disclosure, a method for bandwidth saving for wirelessly enabled cameras using motion vectors in a vehicle includes capturing real-time input image data from one or more wirelessly enabled cameras disposed within the vehicle, including: capturing one or more video frames. The method further includes utilizing a control module, the control module having a processor, a memory, and one or more input/output (I/O) ports, the memory storing programmatic control logic. The processor executing the programmatic control logic. The programmatic control logic includes: receiving, with a first control logic portion via the I/O ports, the real-time input image data from the wirelessly enabled cameras, and processing, with a second control logic portion, the real-time input image data to maintain wireless system (Wi-Fi) bandwidth utilization with the vehicle below a predetermined threshold bandwidth level and maintaining or maximizing real-time input image data streaming quality through semantic segmentation and background memorization. The method further includes performing semantic segmentation by periodically performing pixel-level classification of foreground and background portions of the input image data. The method further includes performing motion vector analysis of the one or more video frames. Information within the one or more video frames is tracked via grid references through each subsequent one of the one or more video frames. The method further includes executing control logic that defines a plurality of macroblocks that are tracked from position to position through motion vector position data, and executing control logic that defines one or more data points within one or more of the macroblocks as falling within a radius that covers all points in motion vector space. The method further includes executing control logic that, upon determining that the radius is less than or equal to a threshold value, defines the one or more data points as background motion vector information, and upon determining that the radius is greater than threshold value, initiates semantic segmentation once more to segment the one or more data points and defines the one or more data points as foreground motion vector information. The method further includes executing control logic that tracks all of the one or more data points that define background information with a single background motion vector; and executing control logic that caches background motion vector data as a background scene that is periodically transmitted to a human-machine interface (HMI) within the vehicle. The method further includes packaging real-time input image data in a per-frame data structure that is shared between the wirelessly enabled device and onboard vehicle control modules. The per-frame data structure defines the background motion vector information and one or more blocks, each of the one or more blocks including a block index, a motion vector, and residuals. The block index is generated by assigning an integer to each macroblock within the input image data. The method further includes performing background memorization by template matching to reduce processing bandwidth utilization for foreground object localization searching from a first amount to a second amount less than the first amount. The template matching: generates a sampling template based on coloration differences within each of the one or more video frames, and tracks positions of the coloration differences through a coordinate system and area calculations defined by: (x, y, w, h), where x defines an X-coordinate, y defines a Y-coordinate, w defines a width, and h defines a height. Template matching further defines a background average motion vector v and defines an initial template matching position as (x', y', w, h) where:

1. x'=x+vx, y'=y+vy, defines a searching area margin Δd such that an entire searching area is given by a rectangular area defined as:
2. (x'+Δd, y'+Δd, w+2Δd, h+2Δd), and defines residuals as values defining pixel value differences between macroblocks for each of the one or more video frames and each subsequent one of the one or more video frames. The method further includes executing control logic for reducing processing bandwidth utilization for foreground object localization searching from a first amount to a second amount less than the first amount by selecting a pixel at a foreground edge within each of the one or more video frames using color gradients. The method further includes mapping a single pixel to a square region of width α, and collecting selected pixels and mapped regions for each of the pixels. The method ranks mapped regions in ascending order within a two-dimensional matrix via pixel value differences. Mapped regions having numerically lower ranking values define areas of the foreground image that contain larger color gradients than mapped regions having numerically higher ranking values. Foreground edges are computed according to:

$$RMSE_{pixels} = \left[\sum_{i=0}^{a} (B_{i,b-1} - F_{i,b})^2 / a\right]^{1/2} \le \beta, \qquad 3.$$

where a is a quantity of pixels, B defines background pixels, F defines foreground pixels, and β is a threshold value, wherein upon determining that the RMSE$_{pixels}$ value is equal to or below the threshold β value, the pixels are taken as defining a boundary between foreground and background portions within the one or more video frames, and upon determining that the RMSE$_{pixels}$ value is greater than the threshold β value, the pixels do not define a boundary between foreground and background within the one or more video frames; and that caches background motion vector data as a background scene. The method further includes generating, with a third control logic portion, an output including the cached background scene and a foreground image portion; and continuously transmitting the foreground image portion to the HMI and overlaying the foreground image upon the background scene, wherein the background image portion contains recurrent information that is periodically transmitted to the HMI.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
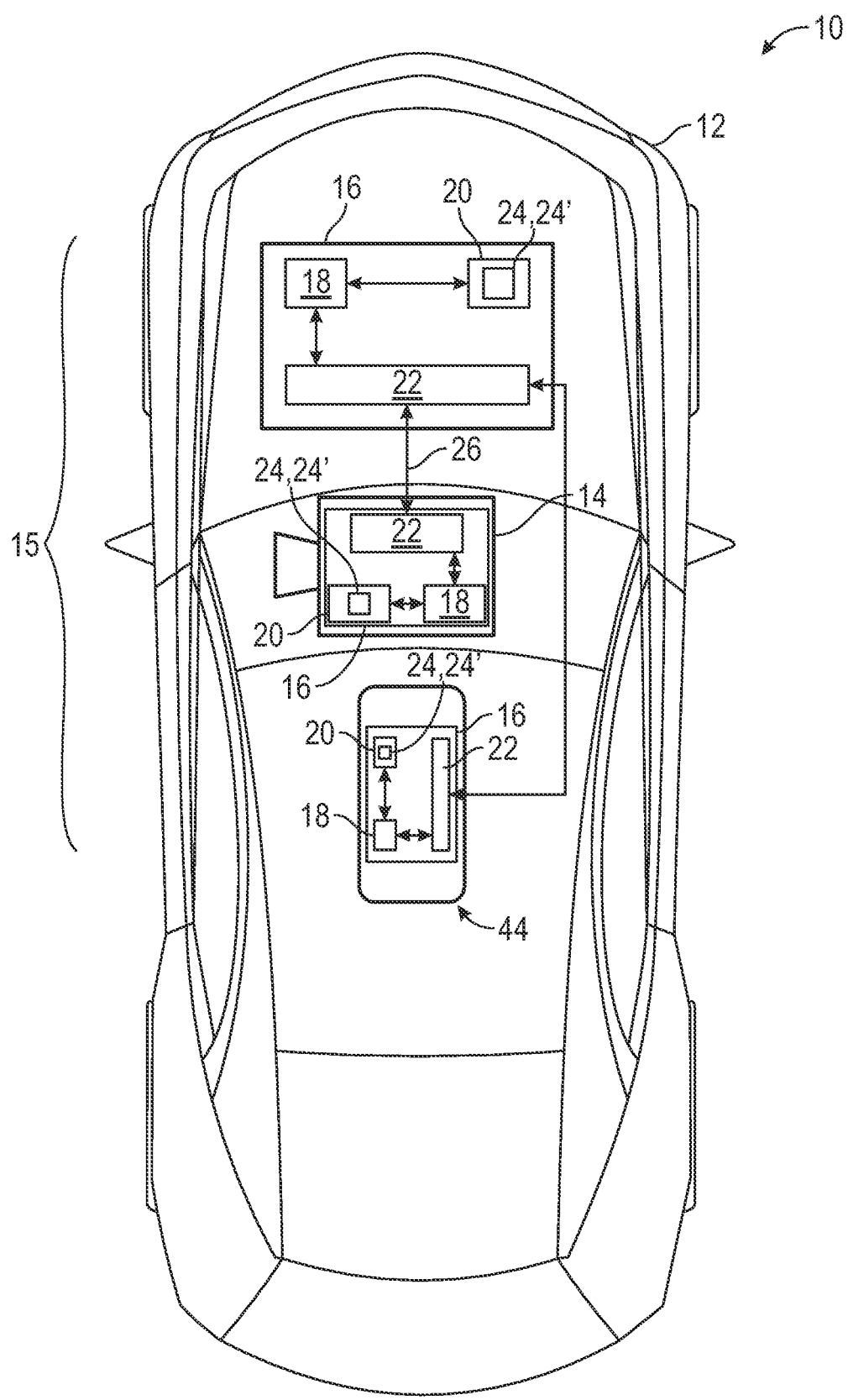
FIG. 1 is an environmental view of a system and method for bandwidth saving for wireless cameras using motion vectors according to an exemplary embodiment.

Referring to FIG. 1, an environmental view of a system 10 for bandwidth saving in vehicles 12 is shown. The system 10 includes one or more wirelessly-enabled cameras 14 connected to a wireless or Wi-Fi network 15 within the vehicle 12. While the vehicle 12 shown in FIG. 1 is a passenger car, it should be appreciated that the vehicle 12 may be any type of vehicle 12 without departing from the scope or intent of the present disclosure. In some examples, the vehicle 12 may be a car, a truck, an SUV, a bus, a semi-tractor, a tractor used in farming or construction or the like, a watercraft, an aircraft such as a plane or helicopter, or the like. Likewise, the camera 14 shown is intended to represent any of a variety of wirelessly-enabled cameras 14 which may be linked to and communicate with an onboard wireless network within the vehicle 12. The cameras 14 may capture optical information in a variety of different wavelengths including those visible to humans as well as infrared, ultraviolet, and other such portions of the light spectrum that are not visible by humans. The cameras 14 may be integrated with the vehicle 12 by the vehicle 12 manufacturer, or the cameras 14 may be fitted in an after-sales service performed by the vehicle 12 or camera 14 manufacturer, by the customer, or by other third parties without departing from the scope or intent of the present disclosure.

The vehicle 12 and cameras 14 are equipped with one or more control modules 16. Each of the control modules 16 is a non-generalized electronic control device having a pre-programmed digital computer or processor 18, non-transitory computer readable medium or memory 20 used to store data such as control logic, software applications, instructions, computer code, data, lookup tables, etc., and one or more input/output (I/O) ports 22. Computer readable medium or memory 20 includes any type of medium capable of being accessed by a computer, such as read-only memory (ROM), random access memory (RAM), a hard disk drive, a compact disc (CD), a digital video disc (DVD), or any other type of memory. A "non-transitory" computer readable medium or memory 20 excludes wired, wireless, optical, or other communication links that transport transitory electrical or other signals. A non-transitory computer readable medium or memory 20 includes media where data can be permanently stored and media where data can be stored and later overwritten, such as any type of program code, including source code, object code, and executable code. The processor 18 is configured to execute the code or instructions. In some examples, the control module 16 may be a dedicated wireless or Wi-Fi controller. The I/O ports 22 are configured to wirelessly communicate using Wi-Fi protocols under IEEE 802.11x, Bluetooth communications protocols, radio frequency (RF) protocols, or the like.

In some examples, the control modules 16 include one or more applications 24. An application 24 is a software program configured to perform specific functions or sets of functions. The application 24 may include one or more computer programs, software components, sets of instructions, procedures, functions, objects, classes, instances, related data, or a portion thereof adapted for implementation in a suitable computer readable program code. The applications 24 may be stored within the memory 20 or in additional or separate memory 20. Examples of the applications 24 include audio or video streaming services, audio or visual processing services and the like.

Figure 2:
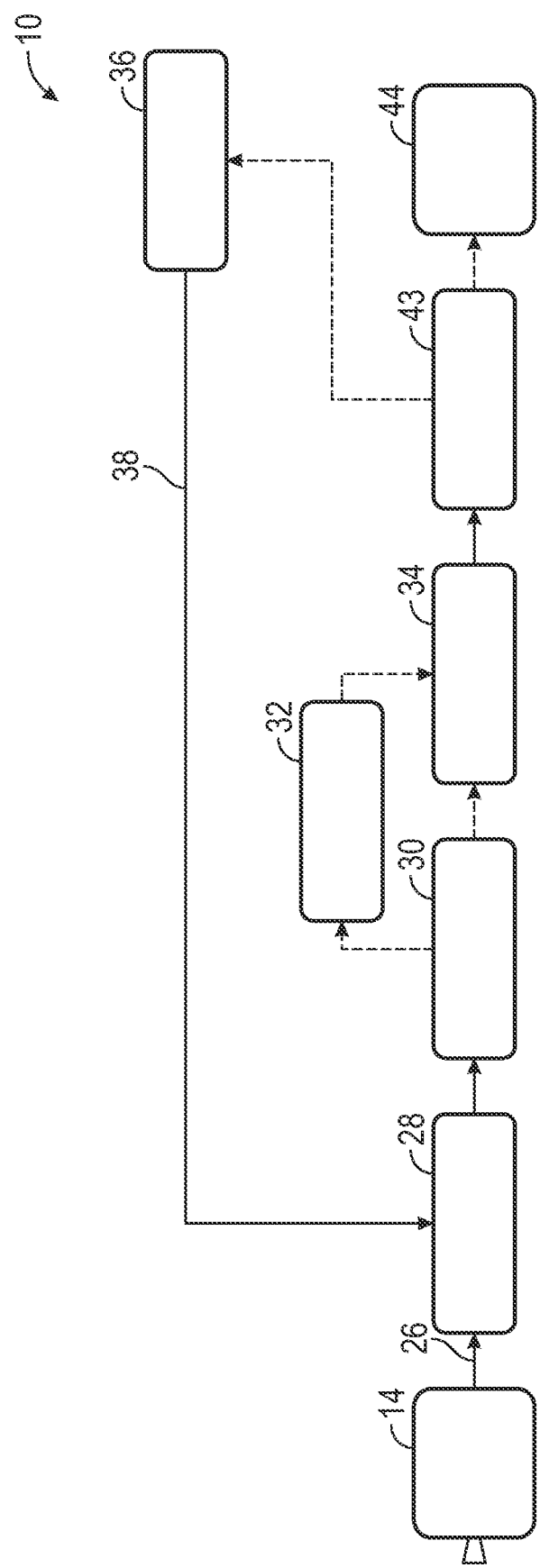
FIG. 2 is a block diagram depicting the system and method for bandwidth saving for wireless cameras using motion vectors according to an exemplary embodiment.

Turning now to FIG. 2, and with continuing reference to FIG. 1, the cameras 14 capture real-time input image data 26 of aspects of the vehicle 12. In some examples, the cameras 14 capture images and/or video in the form of a sequence of video frames 28 of an interior of the vehicle 12. The interior of the vehicle 12 may include a variety of objects, including seats, occupants within some or all of the seats, car-seats, pets, pets within pet restraint systems, cargo, or the like. The real-time input image data 26 may include information relating to the positions and/or movements of the objects within the vehicle 12 interior.

In several aspects, the onboard vehicle 12 Wi-Fi network 15 has a predefined quantity of system bandwidth that is dependent on Wi-Fi hardware and quantities, types, and bandwidth requirements of applications 24 operating on the Wi-Fi hardware within the vehicle 12. It should be appreciated that the quantity of system bandwidth available may vary from vehicle 12 to vehicle 12, may be increased or decreased depending on Wi-Fi hardware capabilities, advances in technology, over-the-air updates, thermal effects, and any of a variety of other factors. Therefore, it should be broadly appreciated that, in order to maintain quality of service (QOS) for each application 24 and Wi-Fi-enabled device operating on the Wi-Fi network 15, bandwidth caps or other such restrictions may be used. In a non-limiting example, the one or more applications 24 include a first control logic that is configured to receive real-time input image data 26 from the cameras 14 via the I/O ports 22. A second control logic portion then performs several processing tasks on the real-time input image data 26 that maintain onboard vehicle 12 Wi-Fi bandwidth utilization within predetermined threshold levels.

More specifically, the second control logic portion encodes the video frames 28 at block 30. The encoding may take any of a variety of forms but should be understood to reduce the amount of data needed for each of the video frames 28. The video frames 28 are also subjected to motion vector analysis 32 and packaged 34 for use in further semantic segmentation 36 and background memorization and masking 38 processes that separate foreground 40 and background 42 objects within real-time input image data 26 video frames 28. Because semantic segmentation 36 processes are resource-intensive from both a computational and data transmission bandwidth perspective, the system 10 performs semantic segmentation 36 periodically, rather than continuously, on real-time input image data 26 and video frames 28 contained therein. The semantic segmentation 36 classifies, at the pixel-level, which objects in a video frame 28 are part of which portions of the scene being recorded by the cameras 14. In a broad non-limiting example, the semantic segmentation 36 classifies pixels in video frame 28 as being a part of the foreground 40 or part of the background 42.

By parsing and decoding 43 real-time input image data 26 in the video frames 28, to separate foreground 40 and background 42 objects, bandwidth utilization by a video application 24' may be held at or below a predetermined threshold value by only periodically transmitting some portions of the captured video to a human-machine interface (HMI) 44 within the vehicle 12. In several aspects, the predetermined threshold value for bandwidth utilization by the video application 24' is selected to maintain QoS for the video application 24', as well as QoS and general functionality for all other applications 24 and Wi-Fi network 15 hardware componentry of the vehicle 12.

Figure 3:
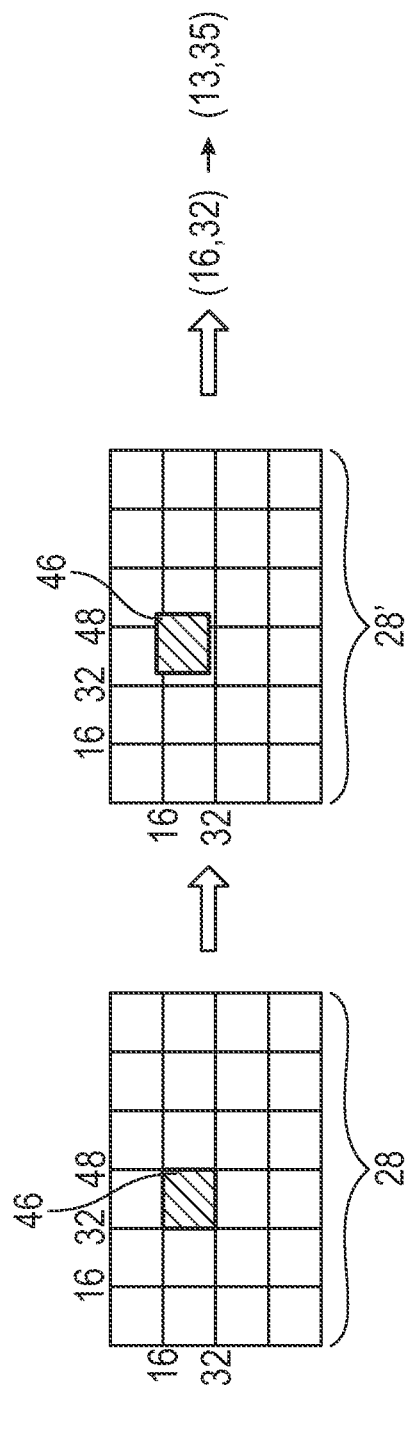
FIG. 3 is a graphical representation of images captured by wireless cameras and divided into macroblocks and tracked by motion vectors according to an exemplary embodiment.

Turning now to FIG. 3, and with continuing reference to FIGS. 1 and 2, in several aspects once a video frame 28 has been semantically segmented into foreground 40 and background 42 portions, the system 10 performs motion vector analysis 32 of the video frame 28 and subsequent video frames 28 that have not been semantically segmented in real-time input image data 26. Information within the one or more video frames 28 is tracked via grid references through each subsequent one of the one or more video frames 28. The encoder in the video application 24' defines a plurality of macroblocks 46 in the video frames 28. Each macroblock 46 is assigned a series of grid references that define the position of image content of the video frames 28 within each of a series of video frames 28. The locations of each of the macroblocks 46 are tracked from position to position through motion vector position data. In several aspects, the motion vector position data of an exemplary macroblock 46' shown in FIG. 3 at a first point in time is given by corner coordinates (16, 32) as shown. At a subsequent point in time, the exemplary macroblock 46' has shifted as content of the video frame 26 has shifted, and new corner coordinates defining the position of the pixels in exemplary macroblock 46' are (13, 35).

Figure 4:
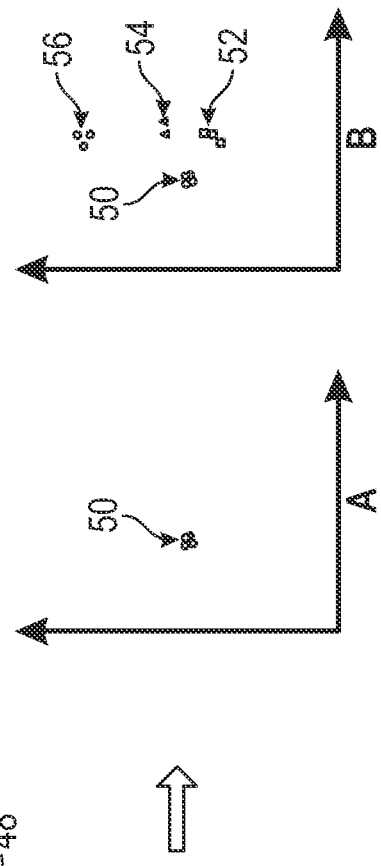
FIG. 4 is a graphical representation of data points tracked within images captured by wireless cameras according to an exemplary embodiment.
Figure 4:
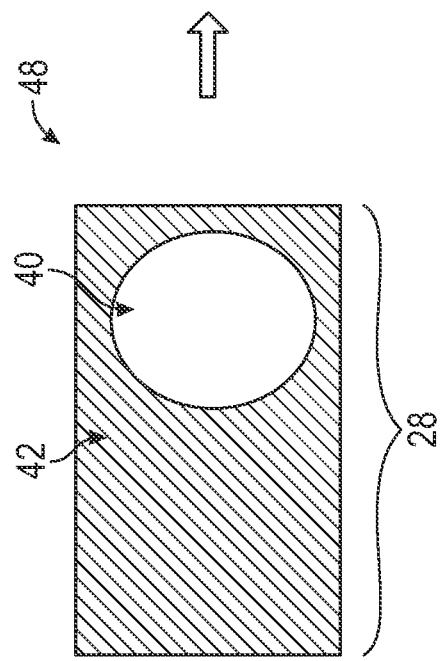

Turning now to FIG. 4, and with continuing reference to FIGS. 1-3, a series of plots depicting a plurality of data points indicating movement of objects within a series of video frames 28 is shown. In simplified form in block 48, the image data in each video frame 28 is shown as being broadly divided into foreground 40 and background 42 regions or objects. In a first graph "A", a series of first data points 50 defining the position of an object that is in a substantially fixed position relative to the camera 14 are shown. In a second graph "B", the first data points 50 are depicted along with a second 52, third 54, and fourth 56 sets of data points. The second 52, third 54, and fourth 56 sets of data points depict objects detected within the same set of video frames 28 as the first data points 50, however, the second 52, third 54, and fourth 56 sets of data points are more broadly dispersed across sections of the video frames 28. Accordingly, second 52, third 54, and fourth 56 sets of data points define positions of objects within the video frames 28 that are moving relative to the camera 14 and relative to the first data points 50.

To simplify and streamline the motion vector process, the video application 24' defines information in real-time input image data 26 in the video frames 28 as falling within a radius that covers all points in motion vector space.

When motion vector analysis has a small radius, i.e. a radius less than or equal to a threshold value to cover a motion vector scatter plot, semantic segmentation is not carried out. That is, because the radius is smaller than or equal to a threshold, first data points 50 remain substantially stationary from one video frame 28 to the next, and semantic segmentation is not used because the first data points 50 are clearly still a portion of the background 42. For example, when sleeping, an occupant of the vehicle 12 may become relatively inert or immobile in relation to the vehicle 12 seats or other vehicle 12 interior components in real-time input image data 26. When substantially inert or immobile, semantic segmentation steps may not be performed, as the radius is smaller than or equal to the threshold.

That is, because the first data points 50 remain substantially stationary from one video frame 28 to the next, the first data points 50 are all distributed within a portion of real-time input image data 26 and within macroblocks 46 that are substantially stationary in motion vector space, the first data points 50 fall within the radius, and the first data points 50 define a portion of the background 42 of real-time input image data 26. Because background 42 objects or information within real-time input image data 26 all fall within a radius that covers all points in motion vector space for each video frame 28, background 42 information is given a single background motion vector v.

However, when the radius becomes larger than the threshold value, this change indicates that objects in real-time input image data 26 are moving at a rate greater than objects determined to be background 42 information. Accordingly, upon determining that the radius is greater than the threshold, real-time input image data 26 is subjected to semantic segmentation and to once more distinguish between foreground 40 and background 42 regions of real-time input image data 26. Referring once more to the sleeping occupant example above, upon waking, the occupant may stretch or otherwise move in relation to the vehicle 12 interior within view in real-time input image data 26. Accordingly, the relatively large motions of the occupant when stretching will cause the radius of the data points corresponding to the occupant's appendages to move such that the radius is greater than the threshold value. The relatively large motions of the occupant will cause the occupant's appendages to encroach into areas previously defined as background 42 in real-time input image data 26, and one or more additional semantic segmentation processes will be run to re-define the metes and bounds of the foreground 40 and background 42 objects in real-time input image data 26. That is, when the video application 24' determines that the radius is greater than the position of the one or more data points, the motion vector analysis 32 defines the one or more data points as foreground 40 objects. Accordingly, because the second 52, third 54, and fourth 56 sets of data points are more widely distributed than the first data points 50, the motion vector analysis 32 determines that the second 52, third 54, and fourth 56 sets of data points define portions of the foreground 40 in real-time input image data 26. Because foreground 40 objects or information within real-time input image data 26 all fall outside the radius defining the background 42 information, and because various foreground 40 objects or information may move independently of one another, each identified foreground 40 object or information is given a distinct foreground motion vector 58 and tracked.

Figure 5:
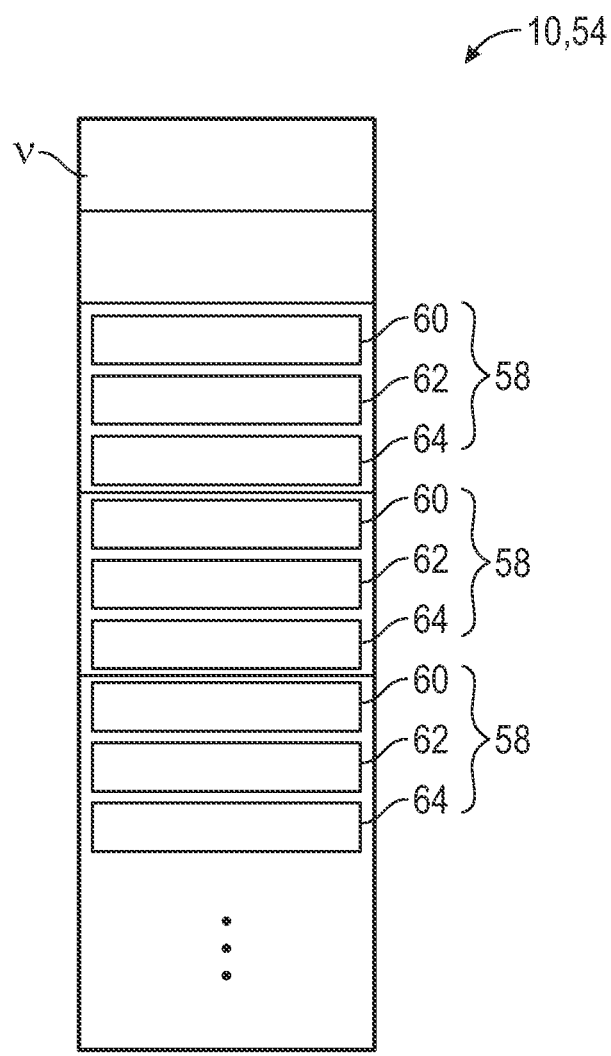
FIG. 5 is a block diagram depicting a data structure for storing background and foreground image data in the system and method for bandwidth saving for wireless cameras using motion vectors according to an exemplary embodiment.

Turning now to FIG. 5 and with continuing reference to FIGS. 1-4, once the motion vector analysis 32 has been completed, the real-time input image data 26 and the results of the motion vector analysis 32 are packaged 34 in a per-video frame 28 data structure that is shared between the wirelessly-enabled cameras 14 and onboard vehicle 12 control modules 16. The per-frame data structure includes the background motion vector v and one or more foreground motion vector 58 blocks. The foreground motion vector 58 blocks are sub-divided into a block index 60, a motion vector 62 and residuals 64. The block index 60 may be an integer or other such value assigned to a particular macroblock 46 being tracked. The motion vector 62 is unique to each macroblock 46 being tracked and indicates one or more of a position, a direction of motion, a rate of motion, an acceleration, or the like. The residuals 64 define pixel value differences between macroblocks 46 for each of the one or more video frames 28 and each subsequent one of the one or more video frames 28.

Figure 6:
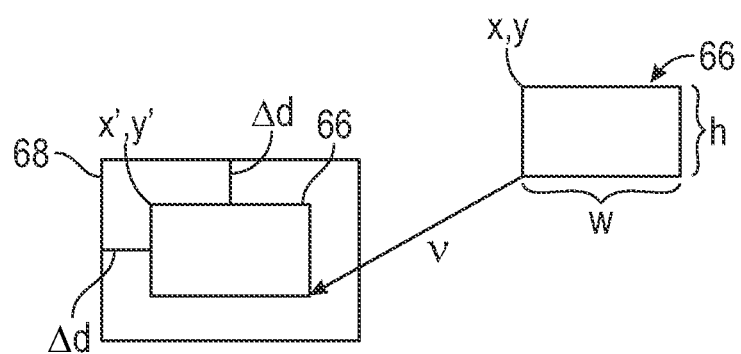
FIG. 6 is a block diagram depicting a portion of a background memorization process utilized by the system and method for bandwidth saving for wireless cameras using motion vectors according to an exemplary embodiment.

Turning now to FIG. 6, and with continuing reference to FIGS. 1-5, the video application 24' subsequently performs background memorization and masking 38. The background memorization includes control logic that utilizes template matching for foreground 40 object localization with a search space reduction mechanism. More specifically, the background memorization and masking 38 process generates a sampling template 66 in a first step. The sampling template 66 is based on coloration differences of pixels within each of the one or more video frames 28. Positions of the coloration differences are tracked through a coordinate system and area calculations defined by (x, y, w, h), where x defines an X-coordinate, y defines a Y-coordinate, w defines a width, and h defines a height of the coloration difference.

In a second step, the background memorization and masking 38 process defines the background average motion vector v and an initial template matching position as (x', y', w, h) where:

1. x'=x+vx, y'=y+vy.

A searching area margin Δd is defined surrounding the sampling template 66. Accordingly, a full searching area is given by the rectangular area defined as:

2. (x'+Δd, y'+Δd, w+2Δd, h+2Δd).

The larger rectangular area 68 including the searching area margin Δd allows for some uncertainty or movement of the sampling template 66 from one video frame 28 to another.

In several aspects, the background memorization and masking 38 process selects a pixel within the one or more video frames 28 at a foreground edge using color gradients. The foreground edges are determined by root-mean-square-error (RMSE) values according to:

$$RMSE_{pixels} = \left[\sum\nolimits_{i=0}^{a}(B_{i,b-1} - F_{i,b})^2/a\right]^{1/2} \le \beta,$$ 3.

where a defines a quantity of pixels, B defines background pixels, F defines foreground pixels, and β defines a threshold value. When the $RMSE_{pixels}$ value is below or equal to the threshold β, the system 10 understands the pixels at the edges to have a high likelihood of defining a boundary between foreground and background portions of the image.

By contrast, when the β value is above the threshold β, the system 10 finds that the pixels in the region at issue not to indicate a boundary between foreground and background portions of the image. Accordingly, when the $RMSE_{pixels}$ value is below or equal to the threshold β, the system 10 maps a single pixel to a square region of width α, and the selected pixels and mapped regions for each of the pixels are collected together into a matrix or other data storage structure. More broadly, the system 10 then ranks mapped regions of the video frames 28 via the pixel value differences. The mapped regions are ranked in ascending order within the matrix or other data storage structure such that mapped regions having numerically lower ranking values define areas of the foreground 40 that contain larger color gradients than mapped regions having numerically higher ranking values.

A third control logic portion then generates an output image. The output image may be transmitted to an HMI 44 disposed on or within the vehicle 12 interior. In several examples, the HMI 44 may be an onboard infotainment screen, an instrument cluster, or the like, or the HMI 44 may be a user-provided device, including but not limited to a screen integrated with the camera 14, or a third-party device such as a smart phone 70, tablet computer, or the like. In several aspects, the output image includes a masked background 42 image portion and a foreground 40 image portion. The foreground 40 image portion is continuously transmitted from the control module 16 via the I/O ports 22 to the HMI 44, because the data contained within the foreground 40 image portion is more highly changeable and moves distinctly from the background 42 image portion. Conversely, the background 42 image portion is transmitted only periodically to the HMI 44, as the background 42 image portion contains information that is less changeable than the foreground 40 image portion. That is, the background 42 image portion contains recurrent image information that is transmitted intermittently to realign the foreground 40 image information relative to the background 42 image information. The periodic transmission of the background 42 image information reduces both computational processing burden as well as Wi-Fi bandwidth necessary to transmit a full output image to the HMI 44 without sacrificing quality of service for the video application 24' or any other applications 24 or hardware utilizing the Wi-Fi bandwidth within the vehicle 12.

Figure 7:
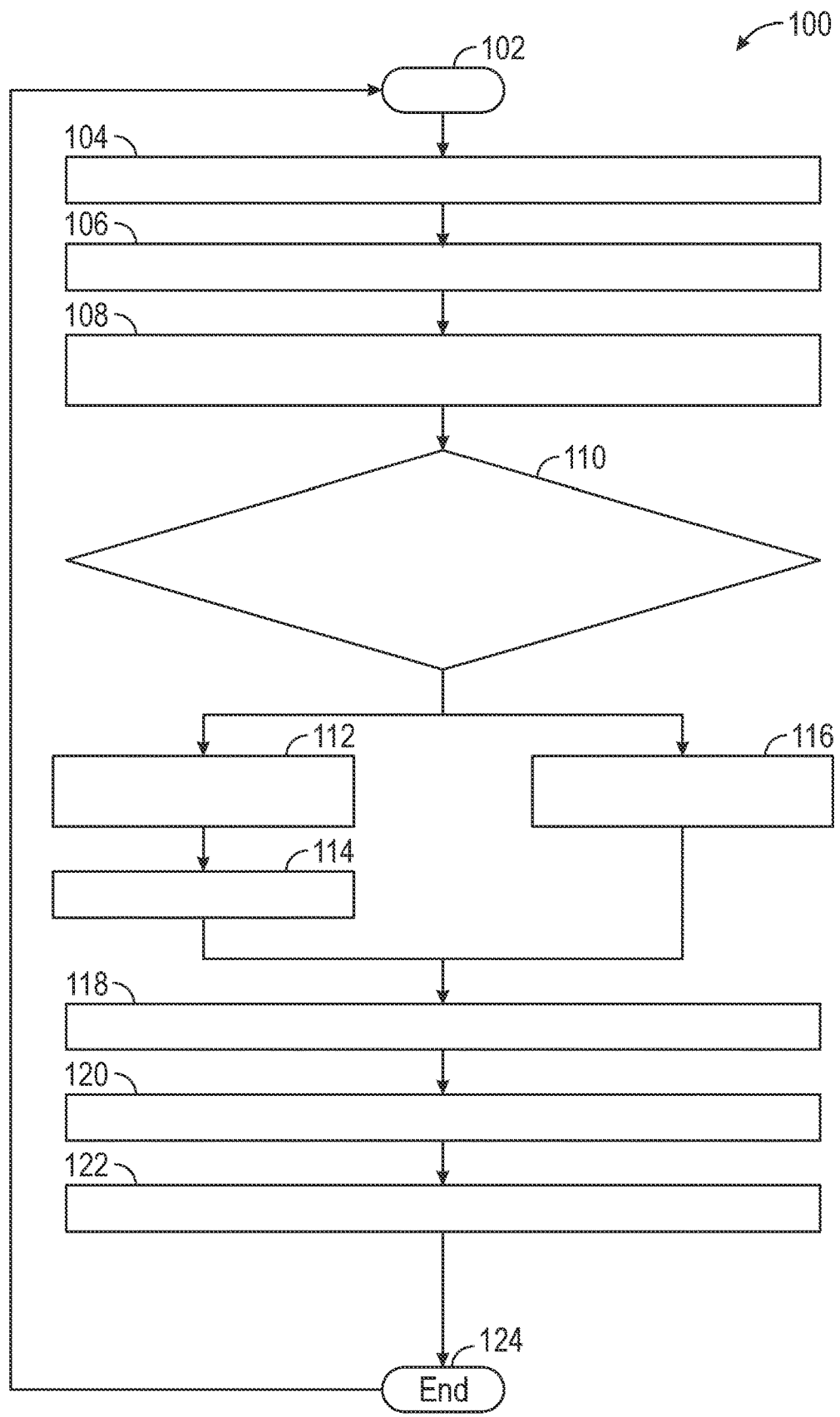
FIG. 7 is a flowchart depicting a method for bandwidth saving for wireless cameras using motion vectors according to an exemplary embodiment.

Turning now to FIG. 7 and with continuing reference to FIGS. 1-6, a method 100 for bandwidth saving for wirelessly-enabled cameras 14 is shown. The method begins at block 102. At block 104, real-time input image data 26 is captured by the cameras 14. At block 106, the real-time input image data 26 is received within one or more control modules 16 in the form of a one or more video frames 28. At block 108, the method 100 causes the control modules 16 to process the real-time data to semantically segment foreground 40 and background 42 information. At block 110, the positions of data points 50, 52, 54, 56 are tracked with motion vectors and grid references.

At block 112, all data points that fall within a predefined radius are defined as background 42 motion vector information. That is, because the first data points 50 remain substantially stationary from one video frame 28 to the next, the first data points 50 are all distributed within a portion of real-time input image data 26 and within macroblocks 46 that are substantially stationary in motion vector space, the first data points 50 fall within the radius, and the first data points 50 define a portion of the background 42 of real-time input image data 26. Because background 42 objects or information within real-time input image data 26 all fall within a radius that covers all points in motion vector space for each video frame 28, background 42 information is given a single background motion vector v. At block 114 the background 42 information is cached for periodic transmission to the HMI 44.

At block 116, data points that have a radius larger than a threshold value trigger semantic segmentation to redefine the background 42 and foreground 40 portions of real-time input image data 26. Data points that fall outside the threshold radius include portions of one or more foreground 40 objects. Accordingly, because the second 52, third 54, and fourth 56 sets of data points are more widely distributed than the first data points 50, the motion vector analysis 32 determines that the second 52, third 54, and fourth 56 sets of data points suggest portions of the foreground 40 in real-time input image data 26, and semantic segmentation may be periodically carried out to redefine the metes and bounds of the foreground 40 and background 42 objects in real-time input image data 26. Because foreground 40 objects or information within real-time input image data 26 all have a radius larger than the threshold, and because various foreground 40 objects or information may move independently of one another, each identified foreground 40 object or information is given a distinct foreground motion vector 58 and tracked.

At block 118 the real-time input image data 26 is packaged in a per-frame data structure that is shared between the wirelessly-enabled camera 14 and onboard vehicle control modules 16. The per-frame data structure includes a block index, a motion vector, and residuals for each macroblock, and a background motion vector for the background image information.

At block 120, the method 100 causes the system 10 to perform background memorization by template matching through tracking color variation within real-time input image data 26 and tracking grid coordinates over time of specific background color variations within real-time input image data 26. Likewise, at block 120, the foreground 40 image information is tracked through grid coordinates of color differences in the input image 26.

At block 122, the method 100 generates an output to the HMI 44 including a background 42 image portion including cached background scene pixels and a foreground 40 image portion 42. The output includes a periodic transmission of the background 42 image portion, while the foreground 40 image portion is continuously transmitted to the HMI 44.

At block 124, the method 100 ends. From block 124, the method 100 proceeds back to block 102 where the method 100 runs continuously while the system 10 is in operation.

A system 10 and method for bandwidth saving for wirelessly enabled cameras 14 using motion vectors in a vehicle 12 of the present disclosure offers several advantages. These include reducing computational complexity and computational burden on hardware and software components of the vehicle 12, reducing Wi-Fi network 15 traffic by avoiding data transmission for the background 42, reducing battery or other power consumption by primarily focusing computational and communications efforts on foreground 40 image information, while maintaining or improving QoS for in-vehicle applications, avoid service outages, and improves camera stability.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for bandwidth saving for wirelessly enabled cameras using motion vectors in a vehicle, the system comprising:
   one or more wirelessly enabled cameras disposed within the vehicle, the one or more wirelessly enabled cameras capturing real-time input image data;
   a control module, the control module having a processor, a memory, and one or more input/output (I/O) ports, the memory storing programmatic control logic, the processor executing the programmatic control logic, the programmatic control logic comprising:
   a first control logic portion that receives, via the I/O ports, the real-time input image data from the wirelessly enabled cameras;
   a second control logic portion that processes the real-time input image data to maintain wireless system (Wi-Fi) bandwidth utilization with the vehicle below a predetermined threshold bandwidth level and maintains real-time input image data streaming quality through semantic segmentation and background memorization; and
   a third control logic portion that generates an output including a masked background image portion and a foreground image portion, wherein the output is transmitted, via the I/O ports, to a human-machine interface (HMI) within the vehicle; and replaces the masked background image portion with cached background data including a background scene that is periodically transmitted to the HMI.

2. The system of claim 1, wherein the real-time input image data defines one or more video frames, and wherein semantic segmentation within the second control logic portion further comprises:
   control logic that periodically performs pixel-level classification of foreground and background portions of the input image data.

3. The system of claim 2, wherein the second control logic portion further comprises:
   control logic that performs motion vector analysis of the one or more video frames, wherein information within the one or more video frames is tracked via grid references through each subsequent one of the one or more video frames.

4. The system of claim 3, wherein the motion vector analysis further comprises:
   control logic that defines a plurality of macroblocks that are tracked from position to position through motion vector position data;
   control logic that defines one or more data points within one or more of the macroblocks as falling within a radius that covers all points in motion vector space; and
   control logic that, upon determining that the radius is less than or equal to a threshold value, defines the one or more data points as background motion vector information, and upon determining that the radius is greater than the threshold value, initiates semantic segmentation once more to segment the one or more data points and defines the one or more data points as foreground motion vector information.

5. The system of claim 4, wherein the background memorization further comprises:

control logic that tracks all of the one or more data points that define background information with a single background motion vector.

6. The system of claim 4 wherein the background memorization further comprises:
control logic that packages real-time input image data in a per-frame data structure that is shared between the wirelessly enabled device and onboard vehicle control modules, wherein the per-frame data structure defines the background motion vector information and one or more blocks, each of the one or more blocks including a block index, a motion vector, and residuals.

7. The system of claim 6 wherein the block index comprises an integer assigned to each macroblock within the input image data; and
the residuals comprise values defining pixel value differences between macroblocks for each of the one or more video frames and each subsequent one of the one or more video frames.

8. The system of claim 4 wherein the background memorization further comprises:
control logic that utilizes template matching to reduce processing bandwidth utilization for foreground object localization searching from a first amount to a second amount less than the first amount, wherein the template matching:
generates a sampling template based on coloration differences within each of the one or more video frames;
tracks positions of the coloration differences through a coordinate system and area calculations defined by: (x, y, w, h), where x defines an X-coordinate, y defines a Y-coordinate, w defines a width, and h defines a height;
defines a background average motion vector v and defines an initial template matching position as (x', y', w, h) where x'=x+vx, y'=y+vy; and
defines a searching area margin $\Delta d$ such that an entire searching area is given by a rectangular area defined as (x'+$\Delta d$, y'+$\Delta d$, w+2$\Delta d$, h+2$\Delta d$).

9. The system of claim 4 wherein the background memorization further comprises:
control logic that reduces processing bandwidth utilization for foreground object localization searching from a first amount to a second amount less than the first amount by:
selecting a pixel at a foreground edge within each of the one or more video frames using color gradients;
maps single pixel to a square region of width $\alpha$;
collecting selected pixels and mapped regions for each of the pixels; and
ranking mapped regions via pixel value differences, wherein the mapped regions are ranked in ascending order within two-dimensional matrix, wherein the mapped regions having numerically lower ranking values define areas of the foreground image that contain larger color gradients than mapped regions having numerically higher ranking values, wherein foreground edges are computed according to $$RMSE_{pixels} = \left[\sum\nolimits_{i=0}^{a}(B_{i,b-1} - F_{i,b})^2/a\right]^{1/2} \leq \beta,$$

where a is a quantity of pixels, B defines background pixels, F defines foreground pixels, and $\beta$ is a threshold value, wherein upon determining that the $RMSE_{pixels}$ value is equal to or below the threshold $\beta$ value, the pixels are taken as defining a boundary between foreground and background portions within the one or more video frames, and upon determining that the $RMSE_{pixels}$ value is greater than the threshold $\beta$ value, the pixels do not define a boundary between foreground and background within the one or more video frames.

10. The system of claim 9 wherein the foreground image portion is continuously transmitted to the HMI and overlaid upon the masked background image portion, and wherein the background image portion contains recurrent information that is periodically transmitted to the HMI.

11. A method for bandwidth saving for wirelessly enabled cameras using motion vectors in a vehicle, the method comprising:
capturing real-time input image data from one or more wirelessly enabled cameras disposed within the vehicle;
utilizing a control module, the control module having a processor, a memory, and one or more input/output (I/O) ports, the memory storing programmatic control logic, the processor executing the programmatic control logic, the programmatic control logic comprising:
receiving, with a first control logic portion via the I/O ports, the real-time input image data from the wirelessly enabled cameras;
processing, with a second control logic portion, the real-time input image data to maintain wireless system (Wi-Fi) bandwidth utilization with the vehicle below a predetermined threshold bandwidth level and maintains real-time input image data streaming quality through semantic segmentation and background memorization;
executing control logic that caches background motion vector data as a background scene;
generating, with a third control logic portion, an output including the cached background scene and a foreground image portion; and
transmitting, via the I/O ports, the output to a human-machine interface (HMI) within the vehicle.

12. The method of claim 11, wherein capturing real-time image date further comprises: capturing one or more video frames, and
wherein processing, with a second control logic portion further comprises:
performing semantic segmentation by periodically performing pixel-level classification of foreground and background portions of the input image data.

13. The method of claim 12, wherein performing background memorization further comprises:
performing motion vector analysis of the one or more video frames, wherein information within the one or more video frames is tracked via grid references through each subsequent one of the one or more video frames.

14. The method of claim 13, wherein performing background memorization further comprises:
executing control logic that defines a plurality of macroblocks that are tracked from position to position through motion vector position data;
executing control logic that defines one or more data points within one or more of the macroblocks as falling within a radius that covers all points in motion vector space; and
executing control logic that, upon determining that the radius is less than or equal to a threshold value, defines the one or more data points as background motion vector information, and upon determining that the radius is greater than threshold value, initiates semantic segmentation once more to segment the one or more data points and defines the one or more data points as foreground motion vector information.

15. The method of claim 14, wherein performing background memorization further comprises:
executing control logic that tracks all of the one or more data points that define background information with a single background motion vector.

16. The method of claim 14 wherein performing background memorization further comprises:
packaging real-time input image data in a per-frame data structure that is shared between the wirelessly enabled device and onboard vehicle control modules, wherein the per-frame data structure defines the background motion vector information and one or more blocks, each of the one or more blocks including a block index, a motion vector, and residuals.

17. The method of claim 16 wherein packaging real-time input image data further comprises:
generating the block index by assigning an integer to each macroblock within the input image data; and
defining residuals as values defining pixel value differences between macroblocks for each of the one or more video frames and each subsequent one of the one or more video frames.

18. The method of claim 14 wherein processing, with a second control logic portion further comprises:
performing background memorization by template matching to reduce processing bandwidth utilization for foreground object localization searching from a first amount to a second amount less than the first amount, and wherein the template matching:
generates a sampling template based on coloration differences within each of the one or more video frames;
tracks positions of the coloration differences through a coordinate system and area calculations defined by: (x, y, w, h), where x defines an X-coordinate, y defines a Y-coordinate, w defines a width, and h defines a height;
defines a background average motion vector v and defines an initial template matching position as (x', y', w, h) where x'=x+vx, y'=y+vy; and
defines a searching area margin Δd such that an entire searching area is given by a rectangular area defined as (x'+Δd, y'+Δd, w+2Δd, h+2Δd).

19. The method of claim 14 wherein performing background memorization further comprises:
executing control logic for reducing processing bandwidth utilization for foreground object localization searching from a first amount to a second amount less than the first amount by selecting a pixel at a foreground edge within each of the one or more video frames using color gradients;
mapping single pixels to a square region of width α;
collecting selected pixels and mapped regions for each of the pixels; and
ranking mapped regions in ascending order within a two-dimensional matrix via pixel value differences, wherein the mapped regions having numerically lower ranking values define areas of the foreground image that contain larger color gradients than mapped regions having numerically higher ranking values, wherein foreground edges are computed according to $$RMSE_{pixels} = \left[\sum_{i=0}^{a}(B_{i,b-1} - F_{i,b})^2/a\right]^{1/2} \le \beta,$$

where a is a quantity of pixels, B defines background pixels, F defines foreground pixels, and β is a threshold value, wherein upon determining that the $RMSE_{pixels}$ value is equal to or below the threshold β value, the pixels are taken as defining a boundary between foreground and background portions within the one or more video frames, and upon determining that the $RMSE_{pixels}$ value is greater than the threshold β value, the pixels do not define a boundary between foreground and background within the one or more video frames; and continuously transmitting the foreground image portion to the HMI and overlaying the foreground image upon the cached background scene, wherein the background image portion contains recurrent information that is periodically transmitted to the HMI.

20. A method for bandwidth saving for wirelessly enabled cameras using motion vectors in a vehicle, the method comprising:
capturing real-time input image data from one or more wirelessly enabled cameras disposed within the vehicle, including: capturing one or more video frames, and
utilizing a control module, the control module having a processor, a memory, and one or more input/output (I/O) ports, the memory storing programmatic control logic, the processor executing the programmatic control logic, the programmatic control logic comprising:
receiving, with a first control logic portion via the I/O ports, the real-time input image data from the wirelessly enabled cameras;
processing, with a second control logic portion, the real-time input image data to maintain wireless system (Wi-Fi) bandwidth utilization with the vehicle below a predetermined threshold bandwidth level and maintains real-time input image data streaming quality through semantic segmentation and background memorization, including:
performing semantic segmentation by periodically performing el classification of foreground and background portions of the input image data;
performing motion vector analysis of the one or more video frames, wherein information within the one or more video frames is tracked via grid references through each subsequent one of the one or more video frames;
executing control logic that defines a plurality of macroblocks that are tracked from position to position through motion vector position data;
executing control logic that defines one or more data points within one or more of the macroblocks as falling within a radius that covers all points in motion vector space;
executing control logic that, upon determining that the radius is less than or equal to a threshold value, defines the one or more data points as background motion vector information, and upon determining that the radius is greater than threshold value, initiates semantic segmentation once more to segment the one or more data points and defines the one or more data points as foreground motion vector information;

executing control logic that tracks all of the one or more data points that define background information with a single background motion vector; and executing control logic that caches background motion vector data as background image portion that is periodically transmitted to a human-machine interface (HMI) within the vehicle;

packaging real-time input image data in a per-frame data structure that is shared between the wirelessly enabled device and onboard vehicle control modules, wherein the per-frame data structure defines the background motion vector information and one or more blocks, each of the one or more blocks including a block index, a motion vector, and residuals;

generating the block index by assigning an integer to each macroblock within the input image data;

performing background memorization by template matching to reduce processing bandwidth utilization for foreground object localization searching from a first amount to a second amount less than the first amount, and wherein the template matching:
  generates a sampling template based on coloration differences within each of the one or more video frames;
  tracks positions of the coloration differences through a coordinate system and area calculations defined by: (x, y, w, h), where x defines an X-coordinate, y defines a Y-coordinate, w defines a width, and h defines a height;
  defines a background average motion vector v and defines an initial template matching position as (x', y', w, h) where x'=x+vx, y'=y+vy; and
  defines a searching area margin Δd such that an entire searching area is given by a rectangular area defined as (x'+Δd, y'+Δd, w+2Δd, h+2Δd)
  defines residuals as values defining pixel value differences between macroblocks for each of the one or more video frames and each subsequent one of the one or more video frames;

executing control logic for reducing processing bandwidth utilization for foreground object localization searching from a first amount to a second amount less than the first amount by
  selecting a pixel at a foreground edge within each of the one or more video frames using color gradients;
  mapping a single pixel to a square region of width;
  collecting selected pixels and mapped regions for each of the pixels; and
  ranking mapped regions in ascending order within a two-dimensional matrix via pixel value differences, wherein mapped regions having numerically lower ranking values define areas of the foreground portion that contain larger color gradients than mapped regions having numerically higher ranking values, wherein foreground edges are computed according to $$RMSE_{pixels} = \left[\sum_{i=0}^{a}(B_{i,b-1} - F_{i,b})^2/a\right]^{1/2} \leq \beta,$$

where α is a quantity of pixels, B defines background pixels, F defines foreground pixels, and β is a threshold value, wherein upon determining that the $RMSE_{pixels}$ value is equal to or below the threshold β value, the pixels are taken as defining a boundary between foreground and background portions within the one or more video frames, and upon determining that the $RMSE_{pixels}$ value is greater than the threshold β value, the pixels do not define a boundary between foreground and background within the one or more video frames; and that caches background motion vector data as a background scene;
  generating, with a third control logic portion, an output including the cached background scene and a foreground image portion; and
continuously transmitting the foreground image portion to the HMI and overlaying the foreground image portion upon the cached background scene, wherein the cached background scene contains recurrent information that is periodically transmitted to the HMI.

* * * * *